US007005760B2

(12) United States Patent
Eaton et al.

(10) Patent No.: US 7,005,760 B2
(45) Date of Patent: Feb. 28, 2006

(54) AUTOMATIC TRANSFER SWITCH SYSTEM CAPABLE OF GOVERNING THE SUPPLY OF POWER FROM MORE THAN TWO POWER SOURCES TO A LOAD

(75) Inventors: Zane C. Eaton, Plymouth, WI (US); George C. Henegar, Kohler, WI (US); Anthony J. Hackbarth, Cleveland, WI (US)

(73) Assignee: Kohler Co., Kohler, WI (US)

( * ) Notice: Subject to any disclaimer, the term of this patent is extended or adjusted under 35 U.S.C. 154(b) by 492 days.

(21) Appl. No.: 10/377,939

(22) Filed: Feb. 28, 2003

(65) Prior Publication Data

US 2004/0169422 A1 Sep. 2, 2004

(51) Int. Cl.
*H02J 9/00* (2006.01)

(52) U.S. Cl. .................................... 307/65; 307/116

(58) Field of Classification Search .................. 307/64, 307/65, 70

See application file for complete search history.

(56) References Cited

U.S. PATENT DOCUMENTS 3,555,290 A 1/1971 Ellermeyer
4,659,942 A 4/1987 Volp
5,182,464 A 1/1993 Woodworth et al.
5,745,670 A 4/1998 Linde
5,917,253 A 6/1999 Rusnack
6,018,204 A 1/2000 Kuruma
6,184,593 B1 2/2001 Jungreis
6,194,794 B1 2/2001 Lampe et al.
6,404,168 B1 * 6/2002 Shoji .......................... 320/134
2002/0079741 A1 * 6/2002 Anderson .................... 307/64

FOREIGN PATENT DOCUMENTS

JP 5-260656 A 10/1993

* cited by examiner

*Primary Examiner*—Brian Sircus
*Assistant Examiner*—Dru Parries
(74) *Attorney, Agent, or Firm*—Quarles & Brady LLP; George E. Haas

(57) ABSTRACT

An automatic transfer switch (ATS) system and method of operating an ATS system for governing the providing of power from first, second and third power sources to a load are disclosed. In one embodiment, the system includes a first ATS device having first and second input ports and a first output port, a second ATS device having third and fourth input ports and a second output port, and at least one communication link coupling the first and second ATS devices. The second output port of the second ATS device is coupled to the second input port of the first ATS device. Additionally, a first signal is provided from the first ATS device to the second ATS device by way of the communication link when power should be supplied from the second ATS device to the first ATS device.

19 Claims, 1 Drawing Sheet

FIG. 1
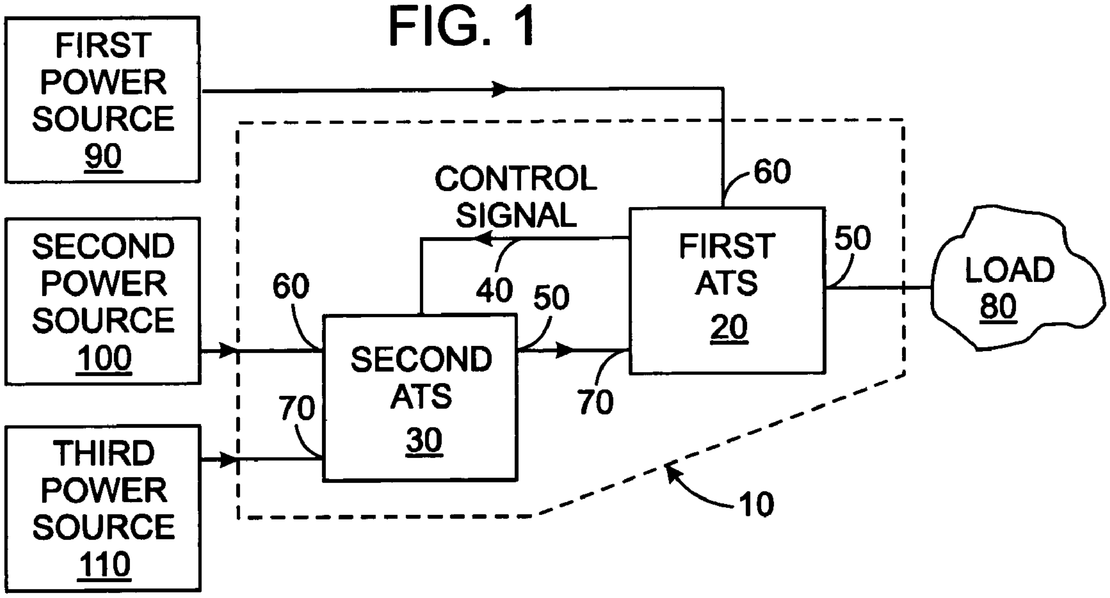
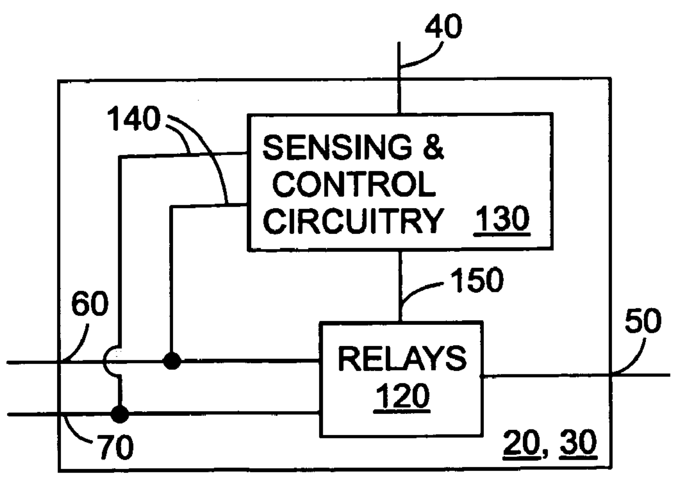
FIG. 2

AUTOMATIC TRANSFER SWITCH SYSTEM CAPABLE OF GOVERNING THE SUPPLY OF POWER FROM MORE THAN TWO POWER SOURCES TO A LOAD

FIELD OF THE INVENTION

The present invention relates to Automatic Transfer Switch (ATS) systems employed to control the coupling of power sources to a load.

BACKGROUND OF THE INVENTION

Automatic Transfer Switch (ATS) systems are widely used to control the delivery of power from two different power sources to a load in a variety of situations, both commercial and residential. For example, a private residence normally receives its electrical power from a utility company. For various reasons, however (e.g., location in a region prone to severe weather), the homeowner can desire a backup source of electrical power, so that comfort or at least habitability of the residence can be maintained during periods in which utility power is unavailable.

Typically, a gasoline, diesel, propane or natural gas internal combustion engine-powered electrical generator, capable of generating three-phase power, is installed in or near the residence, and arranged to be connected to one or more of the electrical circuits in the residence in order to provide the desired backup power. However, one cannot simply leave the backup generator permanently connected, in parallel with the utility power, to the residential electrical circuits. Nor can one simply power up a backup generator and connect it to the residential electrical circuits, without first disconnecting the residential circuits from the power lines coming in from the utility.

To effect the proper switching of the residential electrical circuits or other load from the utility to the backup generator (and eventually back again to the utility), transfer switch systems can be employed. While manual transfer switch systems are available, ATS systems have become popular insofar as an ATS system is able to automatically switch from one power source (e.g., the utility) to another power source (e.g., the backup generator) whenever the system detects that the one power source is not properly providing power, without the intervention of a human operator.

Although a generator can provide desired backup power to a commercial or residential site in the case of a utility power failure, there are also situations in which the generator itself might fail. For example, the fuel supply to the generator can become depleted or the generator could experience a mechanical failure. In circumstances where the backup generator experienced a failure, it would be desirable if a secondary, redundant backup generator or other power source could be coupled to provide power to the load at the commercial or residential site.

Despite the need in some circumstances for redundancy in terms of a backup power supply, conventional ATS systems are designed to allow for only two power sources such as a utility and a single backup generator to be alternately coupled to a load. Most situations in which ATS systems have traditionally been used have not been considered to require redundant backup power sources. The market for ATS systems capable of being alternately connected to three or more power sources has historically been small and only recently has been increasing.

Additionally, it has typically been considered that an ATS system capable of being alternately connected to three or more power sources would require a higher level of complexity of internal circuitry, in order to recognize conditions in which each of the three or more power sources should be coupled to the load or decoupled from the load, and appropriately switch the coupling of the different power sources upon recognizing such conditions. Such complexity would increase the price of, and further reduce the market for, such systems. For these reasons, ATS systems capable of being alternately connected to three or more power sources and providing power to a load from any of those three or more power sources simply have not been manufactured.

Given the aforementioned need for ATS systems capable of governing the supply of power from three or more power sources to a load, it would therefore be advantageous if a new ATS system could be devised that allowed three or more power sources (such as a utility, a primary backup generator and one or more secondary backup generators) to be alternately coupled to a load. It would be particularly advantageous if such a new ATS system was not significantly more complicated than conventional ATS systems that allowed only two power sources to be alternately coupled to a load, such that the costs of design and manufacture, and the retail price, of such a system were not excessive. At the same time, it would be desirable if such a new ATS system was capable of operating to determine conditions under which each of the power sources coupled to the ATS system should be coupled to or decoupled from the load, and capable of controlling the coupling and decoupling of the power sources to and from the load accordingly.

SUMMARY OF THE INVENTION

The present inventors have recognized that more than one Automatic Transfer Switch (ATS) device of largely conventional design can be interconnected or stacked to form a combination "two-plus" ATS system that allows for more than two power sources to be coupled to and decoupled from the load. In one embodiment, the combination two-plus ATS system includes a first two-port ATS device having an output port that is coupled to the load and a first input port that is coupled to a first power source such as a utility. However, a second input port of the first ATS device is, instead of being directly coupled to a second power source such as a backup generator, coupled to the output of a second two-port ATS device.

The second ATS device in turn has first and second input ports that can be respectively coupled to second and third power sources, which can be primary and secondary backup power sources, respectively. In addition to there being a first connection between the output port of the second ATS device and the second input port of the first ATS device, there is also a communication link between the two ATS devices. The first ATS device is able to provide a signal to the second ATS device by way of the communication link when the first ATS device determines that power should be supplied by way of the second ATS device (e.g., because a failure has occurred or is about to occur with respect to the first power source).

In particular, the present invention relates to a system for governing the providing of power from first, second and third power sources to a load. The system includes a first ATS device having first and second input ports and a first output port, a second ATS device having third and fourth input ports and a second output port, and at least one communication link coupling the first and second ATS devices. The second output port of the second ATS device is coupled to the second input port of the first ATS device.

Additionally, a first signal is provided from the first ATS device to the second ATS device by way of the communication link when power should be supplied from the second ATS device to the first ATS device.

Further, the present invention relates to a system for governing the coupling and decoupling of first, second and third power sources to and from a load. The system includes a first ATS device having first and second input ports and a first output port, and a second ATS device having third and fourth input ports and a second output port, where the second output port is coupled to the second input port. The system further includes control means for governing whether the second ATS device is operating to supply power to the first ATS device when the second ATS device receives power at at least one of the third and fourth input ports.

Additionally, the present invention relates to a method of controlling the delivery of power from first, second and third power sources to a load. The method includes providing a first Automatic Transfer Switch (ATS) device having first and second input ports and a first output port, and a second ATS device having third and fourth input ports and a second output port, where the second output port is coupled to the second input port and where the second ATS device is additionally coupled to the first ATS device by a communication link. The method further includes providing a control signal from the first ATS device to the second ATS device by way of the communication link when it is determined that a first condition has occurred. The method additionally includes providing, by way of the second ATS device, power being supplied to at least one of the third and fourth input ports to the second input port of the first ATS device.

BRIEF DESCRIPTION OF THE DRAWINGS

FIG. 1 is a block diagram showing an exemplary combination "two-plus" Automatic Transfer Switch (ATS) system in accordance with one embodiment of the present invention, which includes two-input-port ATS devices, which is coupled to a load and also to three power sources, and which governs the providing of power from those power sources to the load; and FIG. 2 is a block diagram showing internal components of one of the two-input-port ATS devices of FIG. 1.

DETAILED DESCRIPTION OF THE PREFERRED EMBODIMENT

Referring to FIG. 1, an exemplary combination "two-plus" Automatic Transfer Switch (ATS) system 10 includes a first ATS device 20 and a second ATS device 30. The first and second ATS devices 20,30 are generally of conventional design, except insofar as the first ATS device 20 and second ATS device 30 are in communication with one another by way of one or more communication lines 40, as discussed in greater detail below. Thus, each of the first and second ATS devices 20,30 is a two-input-port device having a respective first input port 60, and a respective second input port 70, in addition to a respective output port 50.

Additionally referring to FIG. 2, in one embodiment, each of the first and second ATS devices 20, 30 includes the components shown. In particular, each ATS device 20, 30 includes one or more relays 120 that are controlled by sensing and control circuitry 130. By way of sensing connections 140, the sensing and control circuitry 130 detects power characteristic(s) (e.g., voltage levels) of the power received at the first and second input ports 60,70. The sensing and control circuitry 130 also determines control signals 150 to be provided to the relays that determine whether power received at the first input port 60 or the second input port 70 is provided at the output port 50, or whether no power is provided to the output (e.g., in an off state). Further, the sensing and control circuitry 130 is additionally connected to the communication link(s) 40, such that the circuitry either provides signals onto the communication link(s), receives signals from the communication link(s), or both. The sensing and control circuitry 130 can control the statuses of the relays 120 based upon the sensed power characteristics and/or in response to the communicated information received by way of the communication link(s) 40.

Further as shown in FIG. 1, the combination two-plus ATS system 10 is coupled to a load 80 and to first, second and third power sources 90, 100 and 110. More specifically, the output port 50 of the first ATS device 20 is coupled to the load 80 and the first input port 60 of the first ATS device is coupled to the first power source 90. Additionally, the first and second input ports 60 and 70 of the second ATS device are respectively coupled to the second and third power sources 100 and 110.

The first power source 90 typically is the primary power source (e.g., a utility), while the second and third power sources 100 and 110 typically are, respectively, primary and secondary (redundant) backup power sources (e.g., primary and secondary backup generators). However, in alternate embodiments, a primary power source can be coupled to a different one of the input ports 60,70 than the first input port 60 of the first ATS device 20, and backup power sources can be coupled to different ones of the input ports 60,70 than the first and second input ports of the second ATS device 70. Indeed, in certain embodiments, the different power sources coupled to the combination two-plus ATS system 10 need not strictly act as primary or backup power sources.

Referring still to FIG. 1, the combination two-plus ATS system 10 is capable of governing the supplying of power to the load 80 from the three different power sources 90,100,110, even though it is constructed from first and second ATS devices 20,30 that themselves only have two input ports 60,70 by which those systems are capable of being coupled to power sources. This is achieved by providing communication between the first and second ATS systems 20,30 by way of the communication link(s) 40.

In certain embodiments, the amount of communication that occurs between the first and second ATS systems 20,30 is relatively limited. For example, in one embodiment, the sensing and control circuitry 130 of the first ATS device 20 provides a signal to the second ATS device 30 by way of the communication link 40 whenever the first ATS device determines that power should be provided from the second ATS device 30. The signal in one embodiment simply is, for example, a high voltage level.

In particular, such a signal can be provided if the first power source 90 (e.g., a utility) is not properly supplying power (e.g., due to a power outage) or if, for some other reason, it would be desirable to obtain power from a different power source than the first power source, for example, during testing of one or more of the backup power sources (or a backup system), during peak shaving operation, or because a failure of the first power source is expected or is occurring/has occurred. That is, the signal is provided if it is determined that the power being provided by the first power source 90 satisfies (or does not satisfy) a particular characteristic, for example, the voltage level falls below a minimum threshold, or because it has been determined that an appropriate switching condition has otherwise occurred.

In certain embodiments, one or both of the first and second ATS devices 20,30 has one or more additional input terminals (not shown) at which the ATS device(s) can receive information from other devices (e.g., by way of a network) or from a user input device. This information can include, for example, commands to perform peak shaving or to perform a testing operation. Also, such information can be used by a the sensing and control circuitry 130 (or another control device) to make determinations of whether switching should occur and/or whether the signal should be provided over the communication link(s) 40. Thus, depending upon the embodiment, a variety of information from a variety of sources can determine when, or be used to determine when, the signal is provided over the communication link(s) 40. That is, the degree of intelligence and control capability of the ATS device(s), and sources of information that influence when and whether the ATS devices 20,30 communicate with one another, can vary depending upon the embodiment.

Upon receiving the signal at its respective sensing and control circuitry 130, the second ATS device 30 causes power to be provided from the second power source 100 to the first ATS device 20, which in turn controls its relays 120 to deliver that power to the load 80. If, however, the second power source 100 also is not properly supplying power, then the second ATS device 30 switches so that it is the third power source 110 that supplies power to the first ATS device 20 and thus to the load. Upon resumption of normal power from the first power source 90, the signal provided by the first ATS device 20 to the second ATS device 30 is shut off (e.g., returns to a low or zero voltage value, or otherwise returns to its normal state) and the first ATS device again provides the power from the first power source 90 to the load 80.

Embodiments of the combination two-plus ATS system 10 employing such limited amounts of communication between the first and second ATS devices 20,30 are advantageous insofar as conventional ATS systems can be configured relatively easily for implementation as the first and second ATS devices in such combination two-plus ATS systems. That is, the operation of a conventional ATS system typically includes determining whether the power being provided at one of its input ports 60,70 is satisfactory. While in conventional ATS systems that information is used internally to determine when the ATS system should switch over from one power source to the other, an ATS system can be easily configured to output that information for use by another device, e.g., by way of the communication link 40. Thus, a conventional ATS system can easily be configured for operation as the first ATS device 20.

Additionally, the operation of a conventional ATS system typically includes the activating and deactivating of the ATS system. Thus, it is easy to configure a conventional ATS system to behave in the manner of the second ATS device 30, such that the ATS system becomes activated when one signal is provided by way of the communication link 40 and deactivated when that signal changes.

In alternate embodiments, larger amounts of communication can occur between the individual ATS devices 20,30 of the combination two-plus ATS system 10 than that described above. For example, the first ATS device 20 can communicate information about the load 80 or load power requirements to the second ATS device 30. Also, for example, the second ATS device 30 can provide signal(s) or otherwise communicate information to the first ATS device 20. Such information can include, for example, information about whether the second and third power sources 100,110 are actually coupled to the first and second ports 60,70 of the second ATS device, and about the statuses of those power sources.

While the combination two-plus ATS system 10 of FIG. 1 includes only the first and second ATS devices 20,30, the present invention is intended to encompass alternate embodiments of combination ATS systems that include more than two interconnected ATS devices. For example, the present invention is also intended to encompass a combination ATS system having first, second and third ATS devices that are interconnected or "stacked" in the same manner in which the first and second ATS devices 20,30 are connected.

That is, in such a "three-plus" system, the output of the third ATS device would be coupled to the second input port of the second ATS device, and the output port of the second ATS device would be coupled to the second input port of the first ATS device, and power sources would be coupled to both of the input ports of the third ATS device and to the first input ports of the first and second ATS devices. Additionally, the first and second ATS devices would be in communication with, respectively, the second and third ATS devices (or, alternatively, each of the ATS devices would be in direct communication with each of the other ATS devices, or some other communication arrangement could be made between the ATS devices).

Further, the present invention is intended to encompass combination ATS systems that include two or more stacked ATS devices when one or more of those ATS devices are of a different design than the first and second ATS devices 20,30 shown in FIG. 1. For example, in one alternate embodiment, the first ATS device 20 could include first, second and third input ports for coupling to three different devices that could include, for example, a utility power source, a backup generator, and the second ATS system 30 shown in FIG. 1.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A system for governing the providing of power from first, second and third power sources to a load, the system comprising:

- a first Automatic Transfer Switch (ATS) device having first and second input ports and a first output port;
- a second ATS device having third and fourth input ports and a second output port; and
- at least one communication link coupling the first and second ATS devices,
- wherein the second output port of the second ATS device is coupled to the second input port of the first ATS device, and
- wherein a first signal is provided from the first ATS device to the second ATS device by way of the communication link when power should be supplied from the second ATS device to the first ATS device.

2. The system of claim 1, wherein the first signal is a high voltage level.

3. The system of claim 1, wherein a second signal is provided from the first ATS device to the second ATS device when power should not be supplied from the second ATS device to the first ATS device.

4. The system of claim 3, wherein the second signal is a low voltage level.

5. The system of claim 1, wherein the first ATS device determines that power should be supplied from the second ATS device to the first ATS device when the first ATS device detects a fault in the power being supplied to the first port of the first ATS device from the first power source.

6. The system of claim 1, wherein the first ATS device includes a first switching mechanism, wherein in a first state the first switching mechanism causes power to be supplied to the first output port from the first input port, wherein in a second state the first switching mechanism causes power to be supplied to the first output port from the second input port, and wherein in a third state the first switching mechanism prevents power from being supplied to the first output port from the first and second input ports.

7. The system of claim 6, wherein the second ATS device includes a second switching mechanism, wherein in a fourth state the second switching mechanism causes power to be supplied to the second output port from the third input port, wherein in a fifth state the second switch mechanism causes power to be supplied to the second output port from the fourth input port, and wherein in a sixth state the second switch mechanism prevents power from being supplied to the second output port from the third and fourth input ports.

8. The system of claim 7, wherein the first signal causes the second switching mechanism to enter one of the fourth and fifth states, and an absence of the first signal causes the second switching mechanism to enter the sixth state.

9. The system of claim 1, wherein at least one of the following is true:

the first ATS device includes at least one sensing device capable of detecting a characteristic of the power received at the first input port, and at least one control device capable of determining whether power should be supplied to the first ATS device from the second ATS device based upon whether the characteristic is detected; and the first ATS provides the first signal causing the power to be supplied to the first ATS device from the second ATS device based upon one of a command and information provided to the first ATS device indicating that at least one of testing of a backup system and peak shaving operation is appropriate.

10. The system of claim 9, wherein the first ATS device includes the control device, wherein the control device is further capable of producing the first signal to be provided to a control device of the second ATS device, and wherein the control device is also capable of detecting the characteristic that signifies that a fault has occurred or is expected to occur.

11. The system of claim 1, wherein the first ATS device further includes an additional input port.

12. The system of claim 1, further comprising a third ATS device having fifth and sixth input ports and a third output port, wherein the third output of the third ATS device is coupled to the fourth input port of the second ATS device, and wherein an additional communication link couples the second ATS device with the third ATS device.

13. A method of controlling the delivery of power from first, second and third power sources to a load, the method comprising:

providing a first Automatic Transfer Switch (ATS) device having first and second input ports and a first output port, and a second ATS device having third and fourth input ports and a second output port, wherein the second output port is coupled to the second input port and wherein the second ATS device is additionally coupled to the first ATS device by a communication link;

providing a control signal from the first ATS device to the second ATS device by way of the communication link when it is determined that a first condition has occurred;

providing, by way of the second ATS device, power being supplied to at least one of the third and fourth input ports to the second input port of the first ATS device.

14. The method of claim 13, further comprising:

sensing a power being supplied from one of the power sources to the first input port of the first ATS device; and determining whether the power being supplied at the first input port satisfies a characteristic.

15. The method of claim 14, further comprising:

sensing a status of the power being supplied at the third and fourth input ports; and determining at the second ATS device, upon receiving the control signal, which of the powers being supplied at the third and fourth input ports is communicated to the second input port.

16. The method of claim 14, further comprising:

modifying the control signal when it is determined that the power being supplied at the first input port no longer satisfies the characteristic.

17. The method of claim 16, wherein the first condition is at least one of: an occurrence of a fault; an indication that a fault is about to occur; an indication that a test is being performed; and an indication that peak shaving is being performed.

18. The method of claim 13, further comprising:

providing a third ATS device having fifth and sixth input ports and a third output port, wherein the third output port is coupled to the fourth input port, and wherein the third ATS device is further coupled to one of the first and second ATS devices by an additional communication link.

19. The method of claim 13, wherein at least one of the first and second ATS devices includes an additional input port.

* * * * *